_United States Patent_ [19]

Hashimoto

[11] 4,026,488
[45] May 31, 1977

[54] APPARATUS FOR HOLDING CYLINDRICAL WINDING CORES

[75] Inventor: Kenzo Hashimoto, Kyoto, Japan

[73] Assignee: Nishimura Seisakusho Co., Ltd., Kyoto, Japan

[22] Filed: July 13, 1976

[21] Appl. No.: 704,840

[52] U.S. Cl. ............................................. 242/72 B
[51] Int. Cl.² ........................................ B65H 75/18
[58] Field of Search ............... 242/72 R, 72 B, 56.9

[56] References Cited
UNITED STATES PATENTS

| | | | |
|---|---|---|---|
| 3,010,671 | 11/1961 | Brown | 242/72 B |
| 3,053,467 | 9/1962 | Gidge | 242/72 B |
| 3,104,074 | 9/1963 | Karr | 242/72 B |
| 3,391,878 | 7/1968 | Naccara | 242/72 B |

_Primary Examiner_—Edward J. McCarthy
_Attorney, Agent, or Firm_—Morgan, Finnegan, Pine, Foley & Lee

[57] ABSTRACT

Apparatus for holding cylindrical winding cores comprises a plurality of core holders and a plurality of friction collars are mounted alternately on a single hollow shaft under axial pressure, each of friction collars being allowed to be axially moved and constrained in rotation and each of said core holders having radial expansible means which are radially expanded by an air pressure supplied through the hollow shaft to come into pressure engagement with the inner surfaces of cylindrical winding cores disposed about core holders.

5 Claims, 4 Drawing Figures

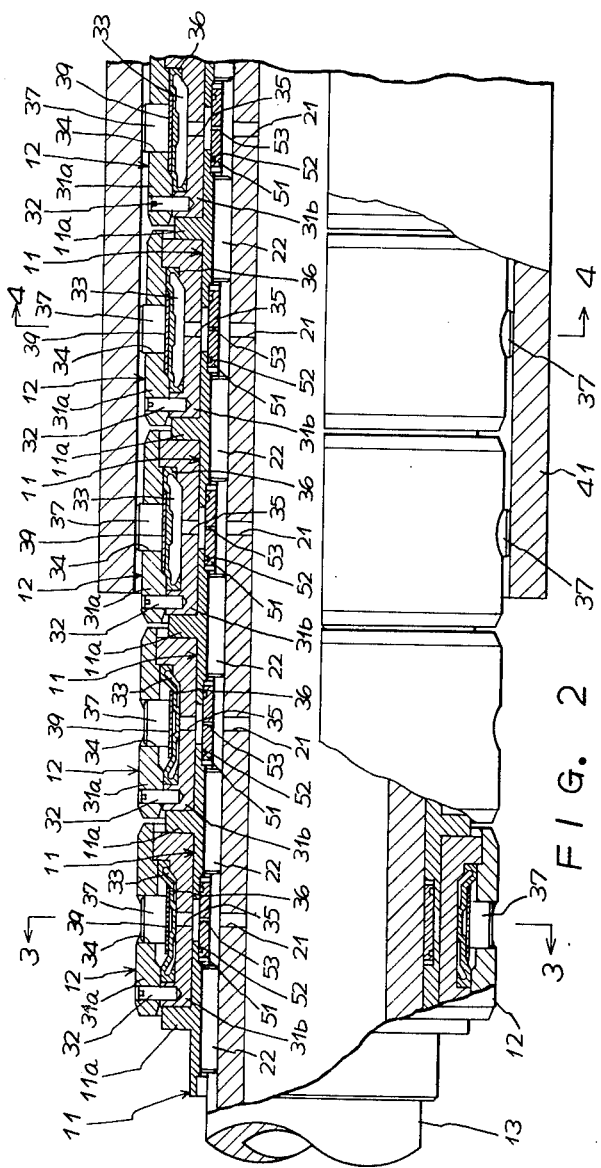

APPARATUS FOR HOLDING CYLINDRICAL WINDING CORES

BACKGROUND OF THE INVENTION

The invention relates to a winding or rewinding shaft, and more particularly to an improvement in a winding or rewinding shaft on which a number of paper tube cores are supported on a single winding shaft in such a manner that said paper tube cores may be independently friction-slipped.

A paper tube supporting device of the individual friction type in which a number of friction collars and a number of paper tube holders are alternately arranged on a single center shaft and held in position with an axial pressure applied thereto is known. In such device, a number of paper tube cores each having a length extending over one or two or more paper tube holders are mounted on a single shaft and are simultaneously rotated by the rotation of the shaft to simultaneously take up or rewind slit paper strips or other long-sized sheet materials. In this connection, since each paper tube holder is capable of frictionally slipping relative to adjacent friction collars, each paper tube core is capable of slipping independently of the shaft in a reasonable manner. In the conventional device of this type, the paper tube holder is provided on the outer surface thereof with tangentially projecting serrations for engagement with a paper tube core so as to penetrate the inner surface of the latter. However, the use of such paper holders involves much time and labor in mounting and dismounting paper tubes and has the disadvantage of damaging paper tube cores and, moreover, the serrations are dangerous to the operator.

The principal object of the invention is to provide a new and improved apparatus for holding cylindrical winding cores on a winding shaft in which the mounting and dismounting of paper tube cores are carried out simultaneously and automatically through the utilization of pneumatic pressure.

The other objects and advantages of the invention will become apparent from the following detailed description of the invention.

SUMMARY OF THE INVENTION

Apparatus for holding cylindrical winding cores on the winding shaft according to the invention comprises a driven hollow shaft having a plurality of apertures arranged at regular intervals in the axial direction to communicate the inside thereof with the outside thereof, means for supplying a pneumatic pressure to the inside of said hollow shaft, and an arrangement of a plurality of friction collars and a plurality of core holder assemblies alternately arranged on said hollow shaft, and means for holding said arrangement of friction collars and core holder assemblies on said hollow shaft under pressure in the direction of the axis of said hollow shaft. Each of the friction collars is axially slidable along the hollow shaft but so constrained as to rotate together with said hollow shaft. Each of the core holder assemblies comprises an annular body frictionally supported between each adjoining two of the friction collars. The annular body defines a pressure chamber therein and has at least one window opening communicating the pressure chamber with the outside of the annular body and at least one another opening communicating the pressure chamber with the inside of the hollow shaft through the aperture in said hollow shaft for introduction of the pneumatic pressure to the pressure chamber. Expansible means is disposed in the pressure chamber. Expansible means is radially expansible in response to the pneumatic pressure introduced to the pressure chamber. Friction catch means is attached to expansible means. Friction catch means is movable together with expansible means along and through the opening in said window opening of the annular body between a first position and a retracted position. At the first opposition the free end of catch means is projected from the window opening and is engageable with the inside wall surface of a cylindrical core when placed about the annular body. At the retracted position catch means is apart from the inside wall surface of the core.

In a preferred embodiment of the invention the pressure chamber in the annular body is defined by an outer peripheral wall, an inner peripheral wall and a pair of side end walls. The outer peripheral wall has at least one window opening communicating the pressure chamber with the outside of the annular body. The inner peripheral wall has at least one opening communicating the pressure chamber with the inside of the hollow shaft through the aperture for introduction of the pneumatic pressure to the pressure chamber. Expansible means may preferably comprise an elastic annular half tube substantially covering the inside wall surface of each of the outer peripheral wall and side end walls of the annular body. Spring means may be additionally provided for returning friction catch means from its first position to its retracted position when the pneumatic pressure is not supplied to the pressure chamber.

It is desirable that the friction collars frictionally engage with core holder assemblies both at the side end walls of said annular body and at said inner peripheral wall of said annular body.

BRIEF DESCRIPTION OF THE DRAWINGS

For a better understanding of this invention, reference may be made to the accompanying drawings wherein the same reference numerals have been used to denote identical parts.

FIG. 2 is a view on an enlarged scale, partly in section, of a part of the winding shaft illustrated in FIG. 1;

DETAILED DESCRIPTION OF THE PREFERRED EMBODIMENT OF THE INVENTION

Figure 1:
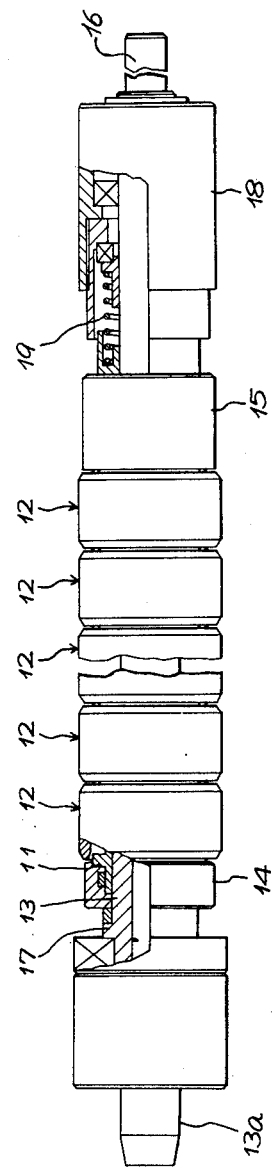
FIG. 1 is a front view, partly cut off, of the winding shaft embodying the invention.

Referring now to the drawings, particularly, to FIG. 1 in which a winding shaft embodying the invention is illustrated, a plurality of friction collars generally indicated as 11 and a plurality of core holder assemblies generally indicated as 12 are alternately arranged on a driven hollow shaft 13 between a pair of end collars 14 and 15. The hollow shaft 13 is rotatably supported at its opposite end portions by suitable bearing means (not shown). A drive force for rotation may be transmitted to the hollow shaft 13 at its one end 13a. The hollow shaft 13 is also connected to means for supplying a pneumatic pressure to the inside of the hollow shaft 13. The reference numeral 16 in FIG. 1 indicates a connection connected to a pneumatic pressure source (not shown) for supplying a pneumatic pressure to the inside of the hollow shaft 13. The end collar 14 abuts against a flange 17 intergrally formed on the hollow shaft 13. The other end collar 15 is slidable along the hollow shaft 13. The end collar 15 is spaced from and opposed to an end cover 18 which is fixed to the hollow shaft 13 to close the other end thereof. Between the end collar 15 and the end cover 18 is disposed spring means 19 for urging the whole arrangement of friction collars 11 and core holder assemblies 12 between a pair of end collars 14 and 15 toward the flange 17 integrally formed on the hollow shaft 13.

Figure 4:
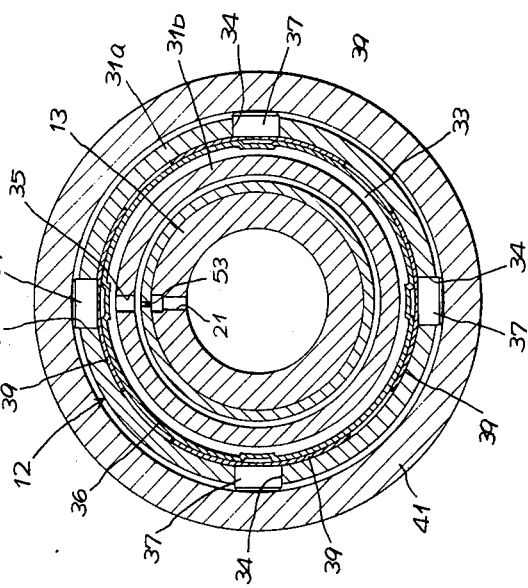
FIG. 4 is a vertical sectional view of the winding shaft taken along the lines of 4—4 in FIG. 2.
Figure 3:
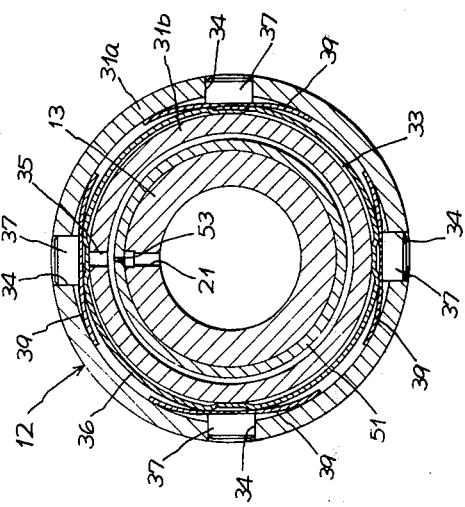
FIG. 3 is a vertical sectional view of the winding shaft taken along the lines of 3—3 in FIG. 2.

The arrangement of a plurality of friction collars 11 and a plurality of core holder assemblies 12 on the driven hollow shaft 13 are illustrated more in detail in FIGS. 2 to 4. The driven hollow shaft 13 has a plurality of apertures 21 arranged at regular intervals in the axial direction to communicate the inside thereof with the outside thereof.

Each of the friction collars 11 may be shaped in the form of a sleeve having a flange 11a at the middle of its length and is mounted on the hollow shaft 13 in such a manner that it is axially slidable along the hollow shaft 13 but so constrained as to rotate together with the hollow shaft 13. The reference numeral 22 indicates a key inserted between each of the friction collars 11 and the hollow shaft 13.

Each of the core holder assemblies 12 is disposed between each adjoining two of the friction collars 11. The friction collar 11 is also disposed between the end collar 14 and the extreme left core holder assembiy and between the extreme right core assembly and the end collar 15, respectively (see FIG. 1).

Each of the core holder assemblies 12 may preferably comprise an annular body which are in contact with and frictionally supported by and between each adjoining two of the friction collars 11. The annular body may preferably comprises an outer ring 31a and an inner ring 31b which are connected to each other by suitable fastening means such as screws 32. The outer ring and the inner ring cooperate to form a pressure chamber 33 therebetween. The outer ring forms the outer peripheral wall of the pressure chamber 33 and the inner ring 31b defines the inner peripheral wall and a pair of side end walls of the pressure chamber 33. The inner ring 31b frictionally engages both at the outside surface of its side end walls and at the outer exposed surface of its inner peripheral wall with the friction collars 11. The outer ring 31a is provided with at least one window opening, preferably, a plurality of (e.g. four) window openings 34 communicating the pressure chamber 33 with the outside of the annular body 31. The inner ring 31b which forms the inner peripheral wall of the annular body is provided with at least one opening 35 communicating the pressure chamber 33 with the inside of the hollow shaft 13 through the aperture 21 for introduction of the pneumatic pressure to the press chamber 33.

Expansible means 36 is disposed in the pressure chamber 33. Expansible means is radially expansible in response to the pneumatic pressure introduced to the pressure chamber 33 and may comprises an elastic annular half tube substantially covering the inside wall surface of each of the outer peripheral wall and the side end walls of the annular body.

Attached to expansible means 36 are friction catch buttons 37. The friction catch buttons 37 are movable together with expansible means 36 along and through the respective openings 34 in the outer peripheral wall of the outer ring 31a of the annular body between a first position at which the free end of each of the catch buttons is projected from the opening 34 in the outer peripheral wall and becomes engageable with the inside wall surface of a paper tube core 41 when placed about said annular body and a retracted position at which each of said catch buttons is apart from the inside wall surface of the paper tube core 41. Preferably, each of the catch buttons 37 is attached to the expansible half tube 36 via leaf spring 39. The leaf spring 39 may function as a return spring for returning the catch button 37 from its projected position to its retracted position when a pneumatic pressure is lost in the pressure chamer 33. When a pneumatic pressure is supplied to the pressure chamber, the leaf spring 39 may cooperates with expansion of the elastic half tube 36 to push the catch buttons 37 outwardly through the respective openings 34.

A seal ring 51 may be inserted around the hollow shaft 13 so as to bridge between each adjoining two of said friction collars 11. The outer peripheral surface of the seal ring 51 is in the slidable contact with the inner wall of each of the two adjoining friction collars 11. The referene numeral 52 indicates grease reservoir recesses to prevent air leakage through the contact surfaces between the seal ring 51 and each of the friction collars 11. The seal ring 51 is also provided with a small through hole 53 for communicating the opening 35 of the inner wall of the annular body with the aperture 21 of the hollow shaft 13.

In the winding shaft of the above construction, paper tube cores 41 are fitted over the core holder assemblies 12. The inner diameter of the paper tube cores 41 is slightly larger than the outer diameter of the outer ring 31a of each of the core holder assemblies so that the paper tube cores 41 can be freely fitted over the core holder assemblies 12. In such condition, when an air pressure is supplied into the interior of the hollow shaft 13 through one end thereof, such air pressure is introduced into the individual pressure chambers 33 through the apertures 21, the fine holes 53 and the openings 35, causing the expansible half tube 36 to be radially expanded, with the buttons 37 projecting through the window openings 34 until they are pressed against the inner surfaces of the paper tube cores 41 (see FIG. 4 and the right half of FIG. 2), thereby enabling the paper tube cores to be held by the holder assemblies 12. When the supply of air pressure is stopped, the expansible half tubes 36 are contracted to their original position to release the paper tube cores 41. The left two core holder assemblies illustrated in FIG. 2 show the state in which the buttons 37 are in the retracted positions. During the operation of the winding shaft, either said air pressure will be continuously fed or both ends of the shaft 13 will be sealed, so as to maintain the air pressure in the interior.

Slit paper strips or other materials may be wrapped around the paper tube cores 41 thus held by the core holder assemblies, and the shaft is positively driven at a speed faster than that of the paper tube cores and core holder assemblies, whereby the core holder assemblies 12, while slipping by an amount corresponding to the difference in the rotative speed, are passively driven by said friction torque due to their slippage.

As for the friction torque, any desired value may be obtained by changing the magnitude of said axial pressure applied from the shaft end, and hence wound articles of any desired winding hardness can be obtained.

As has been described so far, according to the present invention, since the mounting of paper tube cores 41 is achieved by pneumatic means making use of expansible means 36, the mounting and dismounting and fixing and releasing of paper tube cores 41 with respect to the winding shaft can all be extremely simply effected, and since there is no need of providing serrations on paper tube holders as in the conventional device, there is no possibility of damaging the paper tube cores, nor is danger involved in mounting and dismounting the paper tubes. Further, the components are simple in construction and require little manual operation, and they are also economically advantageous since they are highly durable.

In addition, in actual examples of use as when windng thin films, the winding tension required is very low and in the case of films of several hundred mm in width, the number of holders applied to the paper tube cores is increased and the required lateral pressure applied from one end may frequently be relatively low. In this connection, the shafts of the conventional individual friction type have the disadvantages that such very small pressure fails to be uniformly transmitted through all the holders on the shaft and that the unevenness of the roughness of the friction surfaces makes it impossible to achieve a uniform friction torque. In the case of the winding shaft according to the present invention, however, the action of spontaneously equalizing the friction unevenness of the friction surfaces is produced, thereby substantialy eliminating the above described disadvantages.

More specifically, in the winding shaft of the present invention, the pressure on the friction surface for producing said friction torque is the lateral pressure applied from the shaft end minus the pressure provided by the air pressure acting on the lateral end area of the friction collar 11, so that there is the advantage of being able to correspondingly increase the lateral pressure. In other words, the friction surfaces are constantly subjected to an action from the air pressure tending to enlarge the clearances.

Thus, with an air pressure being introduced into the pressure chamber 33, if the very small clearance between the inner ring 31b of the annular body in any one of the pressure chambers 33 and an adjacent friction collar 11 becomes any wider than the clearance related to an adjacent pressure chamber, then the amount of air leaking through said wider clearance becomes larger than that leaking through said second clearance and hence the air pressure in the pressure chamber under consideration becomes lower than that in said second pressure chamber 33, whereby the friction collar 11 subjected to the pressures in the pressure chambers 33 through the friction collar 11 is moved a very small amount axially toward said pressure-decreased pressure chamber 33 to narrow the clearance and reduced the leakage of air, so as to balance the air pressures in the pressure chambers 33. In this manner, the action of equalizing the pressures on the friction surfaces and hence the friction torques is achieved. This action becomes more remarkable if the fine holes 43 are made finer.

Such changes in the clearance between the friction surfaces are very small, of the order of microns allowing the leakage of air and they can be caused not only by the movement of the collars and holders but also by even a very small amount of deformation of the components due to changes in pressure, however high the rigidily of the components may be.

While the above action has been described with reference to two adjacent pressure chambers, the same action will take place between spaced regions (each including a plurality of bobbins) along a long shaft on which a number of collars and bobbins are installed. In that case, along with the friction collars 11, core holder assemblies 12 are also axially moved a very small amount, and a when a plurality of sets of these collars and holders are moved, the net amount of movement is the sum of individual amounts of movement.

As has been described so far, in the winding shaft of the present invention, the interaction between the externally applied lateral pressure and the force returned from the interior by the air pressure constantly moves the collars and bobbins form side to side by a very small amount, resulting in providing the surprisingly superior function of equalizing the friction torque throughout the length of the shaft.

What is claimed is:

1. Apparatus for holding cylindrical winding cores on a winding shaft comprising:
   a driven hollow shaft having a plurality of apertures arranged at regular intervals in the axial direction to communicate the inside thereof with the outside thereof;
   means for supplying a pneumatic pressure to the inside of said hollow shaft;
   an arrangement of a plurality of friction collars and a plurality a core holder assemblies alternatively arranged on said hollow shaft;
   each of said friction collars being axially slidable along said hollow shaft but so constrained as to rotate together with said hollow shaft;
   each of said core holder assemblies comprising:
   an annular body frictionally supported between each adjoining two of said friction collars, said annular body defining a pressure chamber therein and having at least one window opening communicating said pressure chamber with the outside of said annular body and at least one other opening communicating said pressure chamber with the inside of said hollow shaft through said aperture for introduction of said pneumatic pressure to said pressure chamber,
   expansible means disposed in said pressure chamber, said expansible means being radially expansible in response to said pneumatic pressure introduced to said pressure chamber, and
   friction catch means attached to said expansible means, said friction catch means being movable together with said expansible means along and through said opening in said outer peripheral wall of said annular body between a first position at which the free end of said catch means is projected from said opening in said outer peripheral wall and is engageable with the inside wall surface of a cylindrical core when placed about said annular body and a retracted position at which said catch means is apart from said inside wall surface of said core; and
   means for holding said arrangement of said plurality of friction collars and said plurality of core holder assemblies on said hollow shaft under pressure in the direction of the axis of said hollow shaft.

2. Apparatus for holding cylindrical winding cores as defined in claim 1, in which said pressure chamber is defined by an outer peripheral wall, an inner peripheral wall and a pair of side end walls, said outer peripheral wall having at least one window opening communicating said pressure chamber with the outside of said annular body and said inner peripheral wall having at least one opening communicating said pressure chamber with the inside of said hollow shaft through said aperture for introduction of said pneumatic pressure to said pressure chamber.

3. Apparatus for holding cylindrical winding cores as defined in claim 1, in which said expansible means comprises an elastic annular half tube substantially covering the inside wall surface of each of said outer peripheral wall and said side end walls of said annular body.

4. Apparatus for holding cylindrial winding cores as defined in claim 3, further including spring means for returning said friction catch means from said first position to said retracted position when said pneumatic pressure is not supplied to said pressure chamber.

5. Apparatus for holding cylindrical winding cores as defined in claim 2, in which said friction collars frictionally engage with said core holder assemblies at said side end walls and said inner wall of said annular body.

* * * * *